(12) United States Patent
Yamada (10) Patent No.: US 12,178,374 B2
(45) Date of Patent: Dec. 31, 2024

(54) CLEANING SHEET

(71) Applicant: Kikuo Yamada, Tokyo (JP)

(72) Inventor: Kikuo Yamada, Tokyo (JP)

(*) Notice: Subject to any disclaimer, the term of this patent is extended or adjusted under 35 U.S.C. 154(b) by 426 days.

(21) Appl. No.: 17/046,145

(22) PCT Filed: Apr. 10, 2019

(86) PCT No.: PCT/JP2019/015604
§ 371 (c)(1),
(2) Date: Oct. 8, 2020

(87) PCT Pub. No.: WO2019/198750
PCT Pub. Date: Oct. 17, 2019

(65) Prior Publication Data
US 2021/0030250 A1     Feb. 4, 2021

Related U.S. Application Data

(60) Provisional application No. 62/655,352, filed on Apr. 10, 2018.

(51) Int. Cl.
*A47L 13/16*     (2006.01)
*B32B 1/08*     (2006.01)
(Continued)

(52) U.S. Cl.
CPC ............... *A47L 13/16* (2013.01); *B32B 1/08* (2013.01); *B32B 3/30* (2013.01); *B32B 5/266* (2021.05);
(Continued)

(58) Field of Classification Search
CPC .. A47L 13/16; A47L 13/38; B32B 1/08; B32B 3/30; B32B 5/266; B32B 2432/00; D04H 1/26; D04H 1/54; D04H 1/58
See application file for complete search history.

(56) References Cited

U.S. PATENT DOCUMENTS

| | | |
|---|---|---|
| 2002/0065012 A1 | 5/2002 | Takabayashi et al. |
| 2004/0121686 A1 | 6/2004 | Wong et al. |

(Continued)

FOREIGN PATENT DOCUMENTS

| | | |
|---|---|---|
| CN | 101662977 A | 3/2010 |
| CN | 104968249 A | 10/2015 |

(Continued)

OTHER PUBLICATIONS

Second Chinese Office Action in corresponding Patent Application No. 201980031817.6, dated Apr. 12, 2022, and its English translation, 10 pgs.

(Continued)

*Primary Examiner* — Elizabeth M Imani
(74) *Attorney, Agent, or Firm* — Young Basile Hanlon & MacFarlane, P.C.

(57) ABSTRACT

A cleaning sheet that is capable of reliably capturing dust without damaging a cleaning target surface regardless of size and the like of dust falling on the cleaning target surface is described. The cleaning sheet for cleaning a cleaning target object includes a base material sheet, a first brush portion that is provided to the base material sheet and is formed of a fiber material, and a second brush portion that is provided to the base material sheet and is formed of crushed pulp materials that are layered.

20 Claims, 6 Drawing Sheets

(51) Int. Cl.
  *B32B 3/30* (2006.01)
  *B32B 5/26* (2006.01)
  *D04H 1/26* (2012.01)
  *D04H 1/54* (2012.01)
  *D04H 1/58* (2012.01)

(52) U.S. Cl.
  CPC ............. *D04H 1/26* (2013.01); *D04H 1/54* (2013.01); *D04H 1/58* (2013.01); *B32B 2432/00* (2013.01)

(56) References Cited

U.S. PATENT DOCUMENTS

| | | | |
|---|---|---|---|
| 2006/0234586 A1 | 10/2006 | Wong et al. | |
| 2010/0015383 A1 | 1/2010 | Yamada | |
| 2010/0125961 A1* | 5/2010 | Tuman | A47L 13/00 15/160 |
| 2012/0227203 A1* | 9/2012 | Ouellette | A47L 13/16 15/209.1 |
| 2015/0359403 A1* | 12/2015 | Suda | A47L 13/38 15/114 |
| 2015/0366427 A1 | 12/2015 | Suda | |
| 2016/0174777 A1* | 6/2016 | Wang | B32B 5/26 442/57 |
| 2017/0056933 A1 | 3/2017 | Yamada | |
| 2018/0160875 A1* | 6/2018 | Song | D04H 5/08 |

FOREIGN PATENT DOCUMENTS

| | | |
|---|---|---|
| EP | 0 926 288 A1 | 6/1999 |
| EP | 1 978 139 A1 | 10/2008 |
| EP | 2 954 825 A1 | 12/2015 |
| JP | H11-137503 A | 5/1999 |
| JP | 2003-024254 A | 1/2003 |
| JP | 2003-339604 A | 12/2003 |
| JP | 2005-534831 A | 11/2005 |
| JP | 2011-024640 A | 2/2011 |
| JP | 2011-072576 A | 4/2011 |
| WO | 2015/182784 A1 | 12/2015 |
| WO | 2016/108290 A1 | 7/2016 |
| WO | 2018/003566 A1 | 1/2018 |

OTHER PUBLICATIONS

Chinese Denial Decision in corresponding Patent Application No. 201980031817.6, dated Aug. 31, 2022, and its English translation, 9 pgs.
Japanese Office Action in corresponding Patent Application No. 2020-513425, dated Jan. 5, 2023, and its English translation, 6 pgs.
International Search Report of PCT Application No. PCT/JP2019/015604, dated May 23, 2019 and its English translation, 4 pgs.
Chinese Office Action in corresponding Patent Application No. 201980031817.6, dated May 27, 2021, and its English translation, 13 pgs.
Extended European Search Report of European Patent Application No. 19785764.2, dated May 3, 2021, 7 pgs.
Japanese Refusal Decision in corresponding Patent Application No. 2020-513425, dated Jun. 27, 2023, and its English translation, 11 pgs.

* cited by examiner

CLEANING SHEET

TECHNICAL FIELD

The present invention relates to a cleaning sheet used for cleaning, and more particularly to a cleaning sheet suitable for cleaning a floor or a desk.

BACKGROUND

There have been conventionally known cleaning tools for making cleaning target surfaces such as a wood floor, a tatami floor, and the surface of a table be in a clean state free from removal target objects such as dust by capturing foreign objects such as hairs, lint, and dust on the cleaning target surface. Such cleaning tools typically include a head portion to which a cleaning sheet for wiping the cleaning target surface is to be attached at one end of the handle gripped by the user. The user attaches and fixes a cleaning sheet to the head portion, and wipes the cleaning target surface by operating the handle to remove dust on the cleaning target surface.

To more efficiently capture more dust on the cleaning target surface, various efforts to improve the cleaning sheet have been made. For example, in conventional cleaning sheets, the peripheral part of the sheet frequently comes in contact with foreign objects such as dust on the cleaning target surface during cleaning. Thus, the peripheral part of the cleaning sheet mainly captures foreign objects, and the center part tends to infrequently capture foreign objects. As a countermeasure against the above, Japanese Laid-Open Patent Publication No. H11-137503 (hereinafter JPH11-137503) discloses a cleaning sheet in which a viscoelastic adhesive material is provided in the center part of the cleaning sheet to allow foreign objects that have not captured by the peripheral part of the cleaning sheet among foreign objects on the cleaning target surface to be captured by the center part.

BRIEF SUMMARY

However, the cleaning sheet disclosed in JPH11-137503 has a viscoelastic adhesive material. This makes it difficult to slide the cleaning sheet when the cleaning target surface is cleaned, and therefore it is difficult to smoothly clean the cleaning target surface. In addition, in the case of the cleaning sheet disclosed in JPH11-137503, although the adhesive material makes it easier to capture foreign objects, the captured foreign objects are strongly held by the adhesive material. Thus, when a foreign object that is rigid or a foreign object having a sharp part is captured, and the cleaning sheet is moved to wipe the cleaning target surface with the foreign object captured, the captured foreign object may damage the floor surface. In addition, the sizes and materials of dust that the cleaning sheet disclosed in JPH11-137503 can capture when wiping the cleaning target surface during cleaning tend to be limited, and therefore the cleaning sheet disclosed in Patent Document 1 has difficulty in completely capturing various types of dust existing on the cleaning target surface.

The present invention has been made in view of above points, and its objective is to provide a cleaning sheet capable of reliably capturing dust without damaging a cleaning target surface regardless of the size and other properties of dust on the cleaning target surface.

According to an aspect of the present disclosure, there is provided is a cleaning sheet for cleaning a cleaning target object, including a base material sheet; a first brush portion that is provided to the base material sheet and is formed of a fiber material; and a second brush portion that is provided to the base material sheet and is formed of crushed pulp materials that are layered.

The present disclosure provides a cleaning sheet that can capture all kinds of foreign objects having different sizes and materials because the first brush portion having fibers captures hairs, cotton dust, and the like while scraping them and the second brush portion having crushed pulp that is layered captures foreign objects smaller than cotton dust while scraping them. In addition, rigid dust is captured by the second brush portion and the captured dust is held in the second brush portion without protruding from the second brush portion. Thus, the cleaning target surface is not damaged by this kind of dust during wiping, and can be wiped securely.

DETAILED DESCRIPTION

Hereinafter, with reference to the accompanying drawings, a cleaning sheet of the present invention will be described in detail. A cleaning sheet 1 of the present embodiment can be used for both a dry-type cleaning sheet and a wet-type cleaning sheet. A chemical liquid used for the wet-type cleaning sheet is not particularly limited. In addition, the object to be cleaned is not particularly limited. In the present description, the X direction and the Y direction with respect to the cleaning sheet are the directions indicated in FIG. 1 and FIG. 3 to FIG. 6. That is, when the cleaning sheet 1 is attached to a cleaning tool 101 (see FIG. 6), the X direction in the drawing corresponds to the wiping direction in which a floor surface is wiped during cleaning (e.g., measured along a width of the cleaning sheet). In addition, when the cleaning sheet 1 is manufactured, the conveying direction (a machine direction) in which the cleaning sheet 1 is conveyed is the Y direction transverse to the X direction (e.g., measured along a length of the cleaning sheet).

First, the outline structure of the cleaning tool to which the cleaning sheet in accordance with the present invention is attached will be described with reference to FIG. 6. The cleaning tool 101 includes a head portion 102, a handle 103, and a mounting component 104 that mounts and connects the handle 103 to the head portion 102. The cleaning sheet 1 is wrapped around the outer periphery of the head portion 102 of the cleaning tool 101, and side edge portions 5 of the cleaning sheet 1 are both fixed to respective sheet attaching portions (not illustrated) formed in the head portion 102. The structure of the sheet attaching portion for attaching the cleaning sheet 1 to the head portion 102 may be freely selected from conventional methods. For example, grooves as the sheet attaching portions may be formed in predetermined locations of the head portion 102 in advance, and the cleaning sheet 1 may be attached to the head portion 102 by pushing the ends of the cleaning sheet 1 into the grooves. Alternatively, other methods may be employed.

Figure 6:
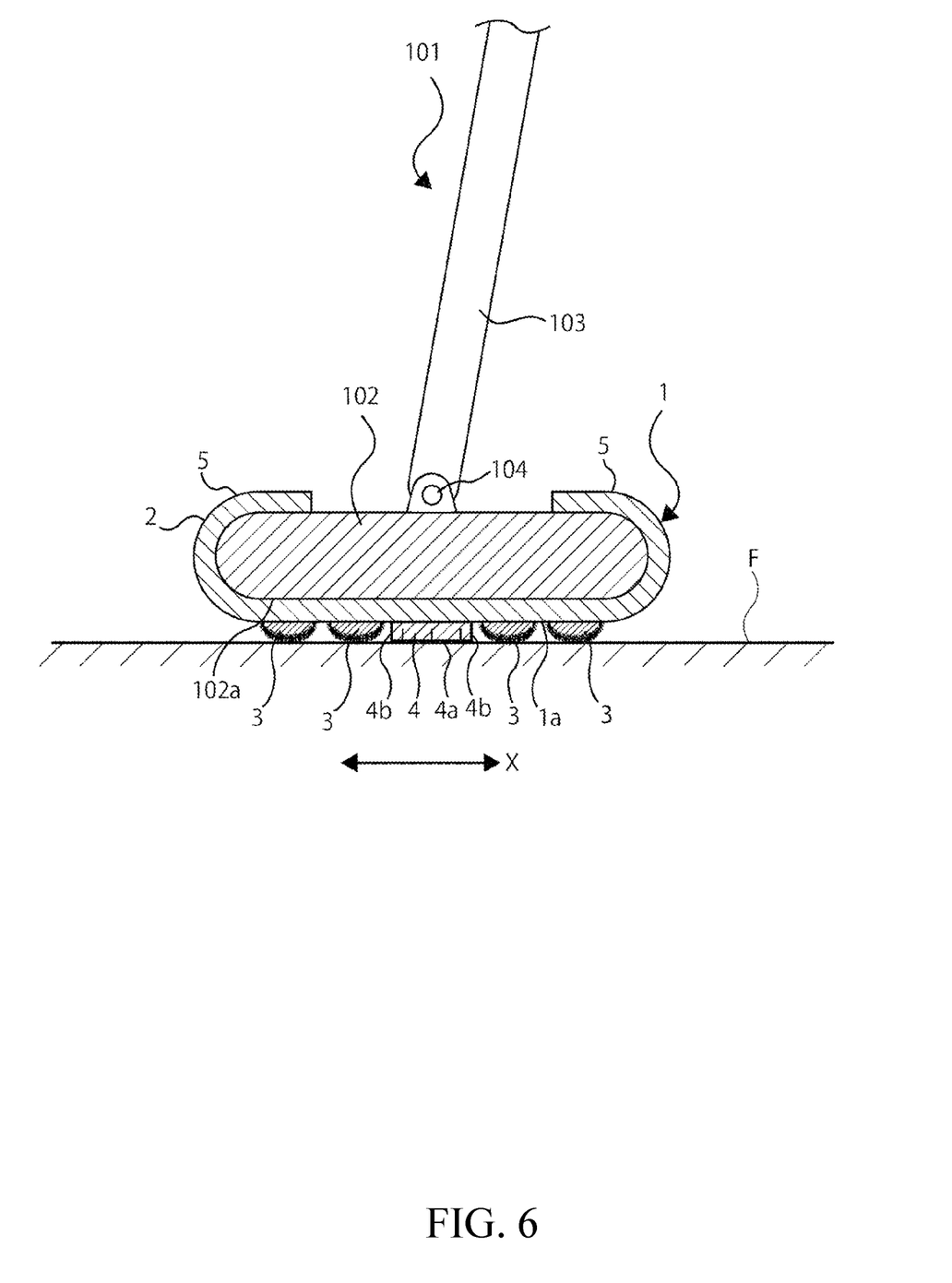
FIG. 6 is an explanatory diagram for describing an outline structure in a state where the cleaning sheet is attached to a cleaning tool.

As illustrated in FIG. 6, the cleaning sheet 1 has a cleaning surface 1a. The cleaning surface 1a is a surface to face a floor surface F when the cleaning sheet 1 is attached to the head portion 102. As illustrated in FIG. 6, the cleaning sheet 1 in accordance with the present embodiment includes first brush portions 3 and a second brush portion 4, which are described later, on a base material sheet 2, and the first brush portions 3 and the second brush portion 4 face the floor surface F. Therefore, in the present embodiment, the cleaning surface 1a is the surface (the lower surface in FIG. 6) of the base material sheet 2 in the part where the base material sheet 2 faces the floor surface F, and is the surface (the lower surface in FIG. 6) of the first brush portion 3 in the part where the first brush portion 3 faces the floor surface F. In addition, in the part where the second brush portion 4 is disposed, the part including a surface 4a of the second brush portion 4 facing the floor surface F and side surfaces 4b of the second brush portion 4 form the cleaning surface 1a. FIG. 6 illustrates the embodiment where only the first brush portions 3 and the second brush portion 4 are in contact with the floor surface F, but this does not intend to suggest any limitation. The floor surface F may be cleaned using the base material sheet 2, the first brush portions 3, and the second brush portion 4. Alternatively, other embodiments may be employed.

Next, a structure of the cleaning sheet 1 will be described using FIG. 1 and FIG. 2. The cleaning sheet 1 includes the base material sheet 2, and the first brush portions 3 and the second brush portion 4 that are formed on the cleaning surface 1a. The first brush portions 3 are located in positions different from that of the second brush portion 4, and the first brush portions 3 are formed of a material different from that of the second brush portion 4. The following describes details of each portion constituting the cleaning sheet 1. Although some of cut portions 8 described later may be usually visually recognized even in FIG. 1 and FIG. 2, for simplicity of the drawings, illustration of the cut portions 8 is omitted in FIG. 1 and FIG. 2.

Base Material Sheet 2

The base material sheet 2 is a member to be a base of the cleaning sheet 1. The surface (the surface facing the floor surface F illustrated in FIG. 6) of the base material sheet 2 is the cleaning surface 1a, and the cleaning surface 1a includes a first joining region 21 in which the first brush portions 3 are provided by joining or the like, and a second joining region 22 in which the second brush portion 4 is provided by joining or the like. The first joining region 21 and the second joining region 22 may be collectively referred to as a cleaning region 23. The cleaning region 23 is a region for capturing removal target objects such as dust existing on the floor surface F and holding the captured removal target objects during cleaning. The side edge portions 5 are formed further out than the cleaning region 23 in the X direction. When the cleaning sheet 1 is attached to the head portion 102 of the cleaning tool 101 described above, the side edge portions 5 are located higher than a bottom portion 102a of the head portion 102, and are attached and fixed to the head portion 102. That is, the cleaning sheet 1 has the cleaning region 23 and the regions where the side edge portions 5 are respectively formed in the base material sheet 2, and the side edge portions 5 are formed at both sides of the cleaning region 23 in the X direction.

A sheet of paper, a sheet of synthetic fiber, a sheet of non-woven fabric, or the like may be used for the base material sheet 2. The present embodiment employs non-woven fabric. Various types of non-woven fabric, including spun lace non-woven fabric, spunbond non-woven fabric, thermal bond non-woven fabric, and air-through non-woven fabric, can be used as the non-woven fabric. Fibers constituting the non-woven fabric may be natural fibers, synthetic fibers, or conjugated fibers. The dimensions of the base material sheet 2 are for example, approximately 200 mm to 300 mm in the X direction and approximately 250 mm to 350 mm in the Y direction, but are not limited to these dimensions. The basis weight of the non-woven fabric is preferably approximately 8 g/m$^2$ to 60 g/m$^2$. The base material sheet 2 may be composed of a single sheet, or may be composed of two or more sheets that are layered. When the base material sheet 2 is formed by layering a plurality of sheets, sheets of the same kind may be layered or sheets of different kinds may be layered. The materials, colors, and thicknesses of the sheets to be layered may be identical or may be different. Furthermore, properties other than the above properties may be identical or may be different.

First Brush Portion 3

Figure 3:
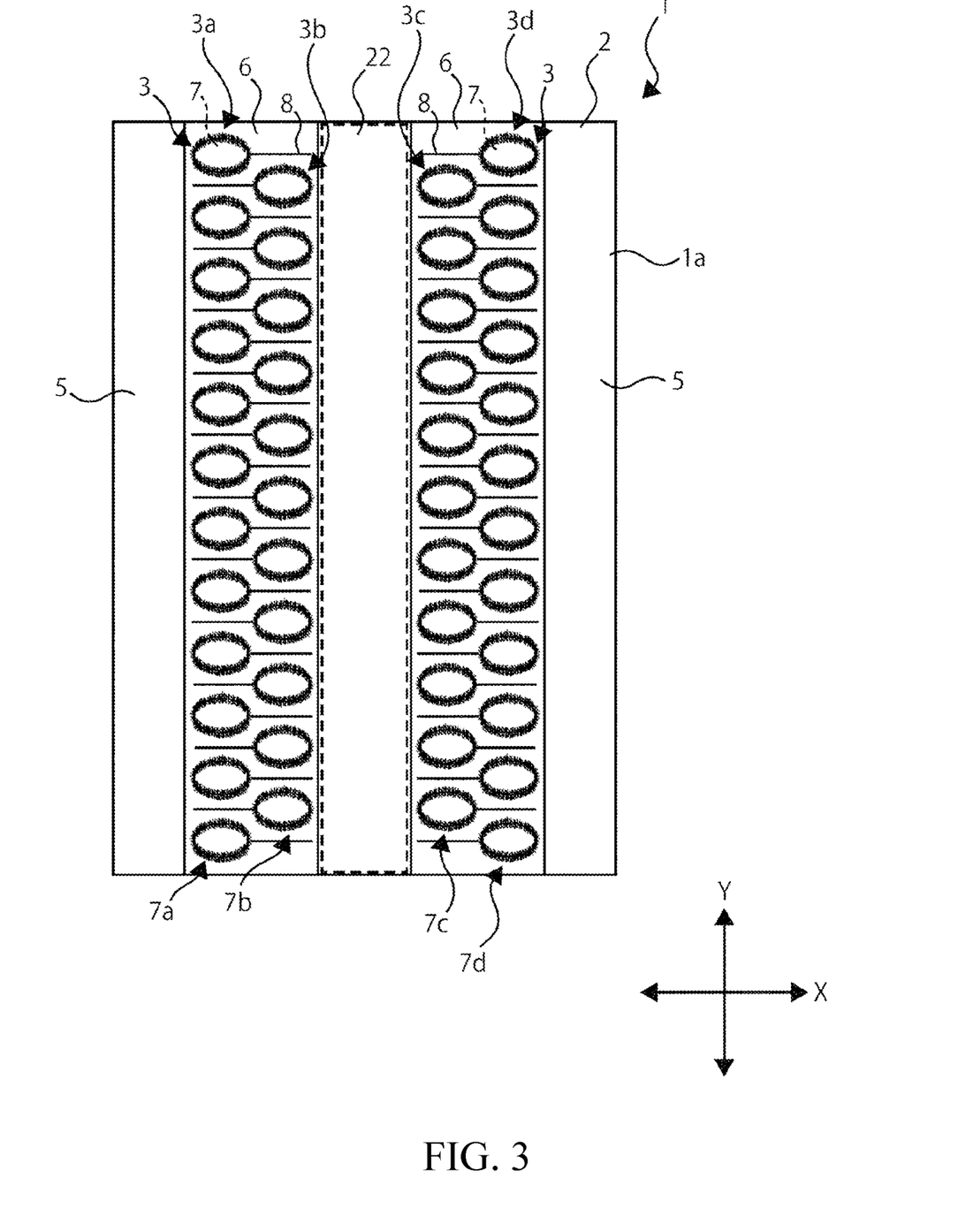
FIG. 3 illustrates the cleaning sheet in the middle of production.

FIG. 3 illustrates the cleaning sheet 1 in the middle of production, and illustrates the state before the second brush portion 4 is joined. In FIG. 3, the part located in the center in the X direction and surrounded by dotted lines is the part to which the second brush portion 4 is to be joined, and the region surrounded by the dotted lines is the second joining region 22. As illustrated in FIG. 3, the first brush portion 3 is formed in two or more parts across the second brush portion 4. In addition, the first brush portion 3 includes a fibrous web 6, a joining portion 7, and a cut portion 8. In the first brush portion 3, the base material sheet 2 and the fibrous web 6 disposed at the surface side of the base material sheet 2 are joined in the joining portion 7. Furthermore, the first brush portion 3 is to be cut in a predetermined position between the joining portions 7 adjacent to each other after joining. That is, the first brush portion 3 is formed by joining the base material sheet 2 and the fibrous web 6 in the joining portion 7 and then cutting the joined fibrous web 6 in a predetermined position. In addition, as illustrated in FIG. 3, the first brush portion 3 is formed in two or more locations in each of the first joining regions 21 in the base material sheet 2. In other words, in the first joining region 21, a plurality of the first brush portions 3 is formed to form one group.

In the description hereinafter, a plurality of first brush portions 3 formed in a row in a manner such that the positions in the X direction are identical and the positions in the Y direction are spaced apart (here, equentially shifted) as illustrated in FIG. 3 is collectively referred to as a group of the first brush portions. In the present embodiment, a first group 3a of the first brush portions, a second group 3b of the first brush portions, a third group 3c of the first brush portions, and a fourth group 3d of the first brush portions are formed. These groups are arranged at predetermined intervals in the direction along the X direction in the base material sheet 2, and the second brush portion 4 is disposed between the second group 3b of the first brush portions and the third group 3c of the first brush portions. In each of these groups: the first group 3a of the first brush portions, the second group 3b of the first brush portions, the third group 3c of the first brush portions, and the fourth group 3d of the first brush portions, the first brush portions 3 are formed so as to form a row in the direction along the Y direction.

The location of the second brush portion 4 is not limited to the location between the second group 3b of the first brush portions and the third group 3c of the first brush portions and may be at other locations. For example, the second brush portion 4 may be disposed between (e.g., extending in the Y direction parallel to) the first group 3a of the first brush portions and the second group 3b of the first brush portions, or between the third group 3c of the first brush portions and the fourth group 3d of the first brush portions. In addition, the number of areas in which the second brush portion 4 is disposed is not limited to one, and the second brush portion 4 may be disposed in two or more areas. For example, the second brush portion 4 may be disposed in all the areas between (e.g., the entirety of) the first group 3a of the first brush portions and (e.g., the entirety of) the second group 3b of the first brush portions, between the second group 3b of the first brush portions and the third group 3c of the first brush portions, and between the third group 3c of the first brush portions and the fourth group 3d of the first brush portions, or in two of these three areas. In addition, the location of the second brush portion 4 is not limited to the locations between two of the first to fourth groups 3a, 3b, 3c, and 3d of the first brush portions, and the second brush portion 4 may be disposed between the first brush portion 3 and another first brush portion 3 both constituting the first group 3a of the first brush portions, for example. In this case, the second brush portions 4 may be disposed in two or more areas.

As illustrated in FIG. 3, the positions in the Y direction where the first brush portions 3 constituting the first group 3a of the first brush portions are formed and the positions in the Y direction where the first brush portions 3 constituting the second group 3b of the first brush portions are formed are shifted from each other in the Y direction. Similarly, the positions in the Y direction where the first brush portions 3 constituting the third group 3c of the first brush portions are formed and the positions in the Y direction where the first brush portions 3 constituting the fourth group 3d of the first brush portions are formed are shifted from each other in the Y direction.

In the cleaning sheet 1 of the present embodiment, the first brush portions 3 constituting the second group 3b of the first brush portions are disposed in a manner such that each of the first brush portions 3 of the second group 3b is located between the first brush portion 3 and another first brush portion 3 constituting the first group 3a of the first brush portions. Similarly, the first brush portions 3 constituting the fourth group 3d of the first brush portions are disposed in a manner such that each of the first brush portions 3 of the fourth group 3d is located between the first brush portion 3 and another first brush portion 3 constituting the third group 3c of the first brush portions. In other words, the positions in the Y direction where the first brush portions 3 constituting the first group 3a of the first brush portions are formed and the positions in the Y direction where the first brush portions 3 constituting the second group 3b of the first brush portions are formed are staggered, and the positions in the Y direction where the first brush portions 3 constituting the third group 3c of the first brush portions are formed and the positions in the Y direction where the first brush portions 3 constituting the fourth group 3d of the first brush portions are formed are staggered.

The first brush portions 3 formed in a staggered manner allows removal target objects on the floor surface F to be captured more easily by the first brush portions 3 when the cleaning sheet 1 is moved in the X direction during wiping. The arrangement of the first brush portions 3 is not limited to a staggered arrangement, and other conventional arrangements may be freely selected. In addition, although the present embodiment describes an exemplary case where the first brush portions 3 of the groups 3a, 3b, 3c, and 3d of the first brush portions are arranged in a staggered manner only in the Y direction, the first brush portions 3 of the groups 3a, 3b, 3c, and 3d of the first brush portions may be arranged in a manner such that the first brush portions 3 are staggered in the X direction and the Y direction.

A plurality of the joining portions 7 constituting each group of the first brush portions, i.e., the first group 3a of the first brush portions, the second group 3b of the first brush portions, the third group 3c of the first brush portions, and the fourth group 3d of the first brush portions, is referred to as a joining portion group. That is, in the present embodiment, as illustrated in FIG. 3, four joining portion groups: a first joining portion group 7a, a second joining portion group 7b, a third joining portion group 7c, and a fourth joining portion group 7d are formed. The number of groups such as the first joining portion group 7a, the second joining portion group 7b, the third joining portion group 7c, and the fourth joining portion group 7d may be freely selected, and the number of the joining portions constituting one joining portion group may be freely selected.

The conventionally known methods may be freely selected to arrange the first brush portions 3. In addition, the predetermined position in which the fibrous web 6 described above is cut may be freely selected. For example, the fibrous web 6 may be cut at the midpoint between the joining portions 7 adjacent to each other, or may be cut in the position closer to one of the joining portions 7 than to the midpoint between the joining portions 7 adjacent to each other. When the fibrous web 6 is cut at the midpoint between the adjacent joining portions 7, the length of the fiber extending from one of the joining portions 7 adjacent to each other becomes equal to the length of the fiber extending from the other. Therefore, the lengths of the fibers can be adjusted to the length suitable for removal target objects to be captured, and the removal target objects can be thereby stably captured. In addition, when the fibrous web 6 is cut in the position closer to one of the joining portions 7 than to the midpoint, the length of the fiber extending from one of the joining portions 7 adjacent to each other can be made to be different from the length of the fiber extending from the other. Therefore, a wide variety of removal target objects can be captured by making the lengths of the fibers different. For example, there are removal target objects that are more easily captured by short fibers and removal target objects that are more easily captured by long fibers. Thus, the ranges of removal target objects that the fibers can easily capture can be freely adjusted by making the lengths of the fibers different.

In addition, a first guide path S1 and a second guide path S2 are formed between the joining portions 7. The first guide path S1 and the second guide path S2 guide removal target objects on the floor surface F to the first brush portion 3 or the second brush portion 4 when the cleaning sheet 1 is moved in, for example, the X direction during wiping. The first guide path S1 is formed between the first brush portion 3 and the second brush portion 4 to allow removal target objects to be easily captured by the first brush portion 3 or the second brush portion 4. The second guide path S2 is formed between the joining portions 7 adjacent to each other to allow removal target objects to be easily captured by the joining portion 7 of the first brush portion 3 or the side surface 4b of the second brush portion 4. Formation of the first guide path S1 and the second guide path S2 allows the removal target objects that are not completely captured by the first brush portion 3 to be easily captured by the second brush portion 4.

Fibrous Web 6

In the present embodiment, used for the fibrous web 6 is natural fiber such as cotton or wool, synthetic fiber such as polyethylene, polypropylene, polyethylene terephthalate, nylon, or polyacrylic fiber, or conjugated fiber such as sheath-core fiber, sea-island fiber, or side-by-side type fiber. The fibers constituting the fibrous web 6 used for the first brush portion 3 are preferably thermoplastic fibers having a thermal adhesiveness with the base material sheet 2. In particular, sheath-core conjugated fiber of which the core is made of polypropylene and the sheath is made of polyethylene is more preferable because such a sheath-core conjugated fiber has excellent thermal adhesiveness due to polyethylene constituting the sheath and firmness due to polypropylene constituting the core. The fibers with a diameter of approximately 0.01 mm to 0.3 mm are used. The fibers may be composed of only one kind of fibers made of the same material and having the same diameter and the same color, or may be composed of two or more kinds of fibers having different properties. Although two fibrous webs 6 are illustrated in FIG. 3, three or more fibrous webs 6 may be provided. In the structure where the second brush portion 4 is located at the end side of the base material sheet 2, one fibrous web 6 may be provided. As seen above, the fibrous web 6 is formed in the part excluding the second brush portion 4 and the side edge portions 5. As described above, when the base material sheet 2 has a dimension in the X direction of approximately 200 mm to 300 mm and a dimension in the Y direction of approximately 250 mm to 350 mm, approximately 3 g to 8 g of the fibrous web 6 is used.

Joining Portion 7

The joining portions 7 partially join the fibrous web 6 to the base material sheet 2 in a plurality of points. Various methods such as ultrasonic joining, adhesive joining, thermal fusion bonding, and sewing may be used alone or in combination to form the joining portions 7. The present embodiment describes an exemplary case where the fibrous web 6 is joined to the base material sheet 2 by ultrasonic joining. In the present embodiment, the joining portions 7 formed along the Y direction are formed in two rows respectively at both sides of the second brush portion 4 in the X direction as the above joining portion groups (the first joining portion group 7a, the second joining portion group 7b, the third joining portion group 7c, and the fourth joining portion group 7d). The joining portions 7 included in one of the rows next to each other in the X direction (for example, one of the first joining portion group 7a and the second joining portion group 7b, and one of the third joining portion group 7c and the fourth joining portion group 7d) and the joining portions 7 included in the other are arranged so as to be shifted from each other in the Y direction.

The number of rows of the joining portions 7, the number of the joining portions 7, and the interval between the joining portions 7 may be freely selected. In addition, the joining portions 7 may be formed either on the base material sheet 2 or on the fibrous web 6. The present description describes an exemplary case where the joining portions 7 are provided to the base material sheet 2 or the fibrous web 6 as necessary, but the locations where the base material sheet 2 and the fibrous web 6 are joined are not limited to the above description.

Cut Portion 8

Figure 4:
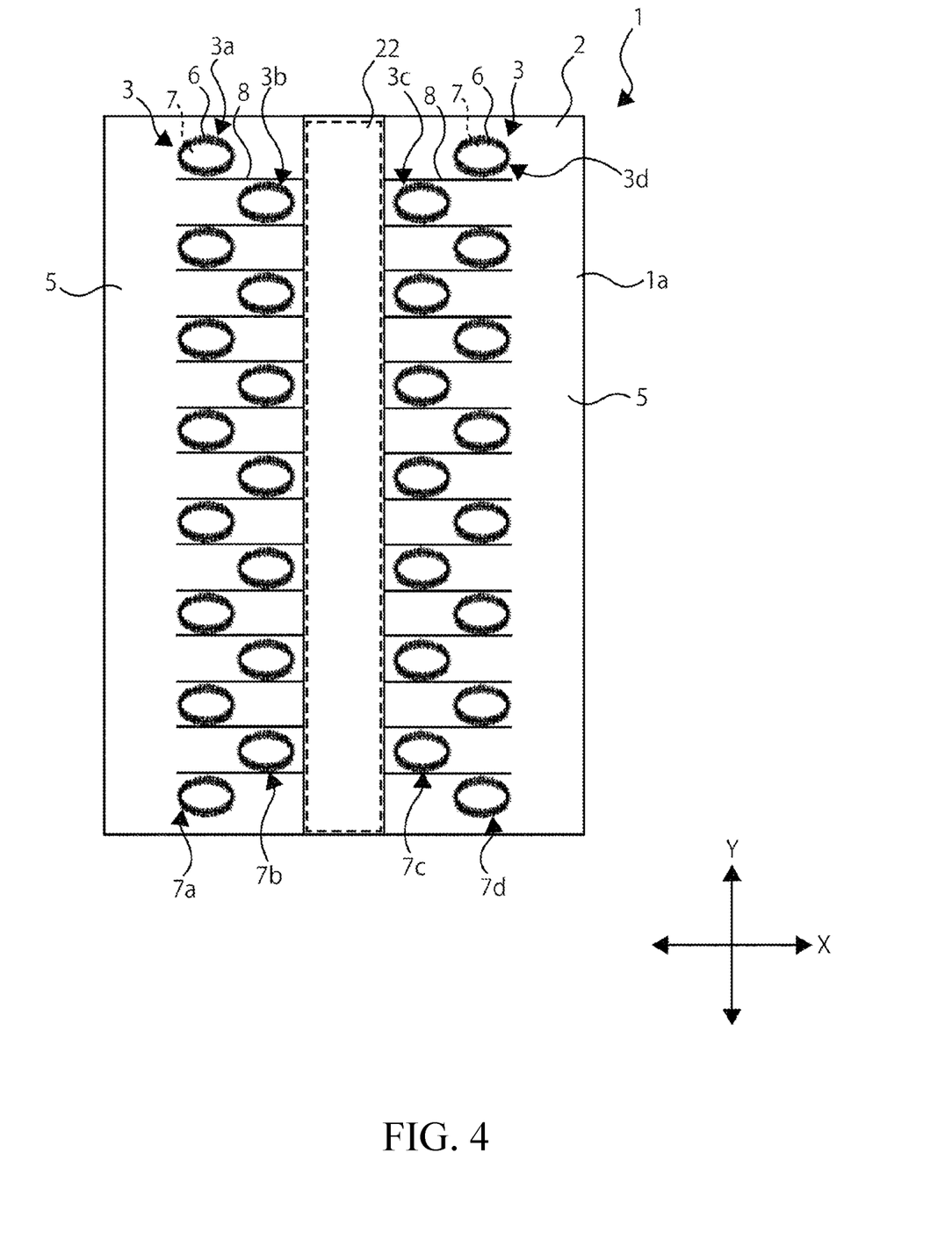
FIG. 4 illustrates another example of the cleaning sheet in the middle of production.

The cut portion 8 forms a cut in the X direction of the fibrous web 6. This cut is formed to raise the fibrous web 6 using compressed gas in the subsequent process as described later. In FIG. 3, the cut portion 8 is formed from one end of the fibrous web 6 to the joining portion 7, but this does not intend to suggest any limitation. For example, as illustrated in FIG. 4, the cut portion 8 may be formed from one end to the other end of the fibrous web 6 while avoiding the joining portion 7. In addition, the position where the joining portion 7 is formed may be shifted in the X direction, and the cut portions 8 may be formed at both sides of the joining portion 7. The number of the cut portions 8 and the cut depth of the cut portion 8 can be appropriately set, and the depth of the cut portion 8 may be a depth reaching the base material sheet 2.

When the first brush portion 3 is composed of fiber that is heat-sealable with the base material sheet 2, the first brush portion 3 is formed by stacking the long-fibered fibrous web 6 on the base material sheet 2. The fibrous web 6 stacked on the base material sheet 2 is disposed in a manner such that the fibrous direction is along the Y direction in FIG. 3, and the fibrous web 6 and the base material sheet 2 are joined by intermittent heat sealing. In this case, as illustrated in FIG. 3, the first joining portion group 7a and the second joining portion group 7b are formed so as to be located in different positions in the Y direction. That is, as viewed only in the Y direction, each joining portion 7 constituting the second joining portion group 7b is disposed between the corresponding two joining portions 7 of the row constituting the first joining portion group 7a.

It is not illustrated in FIG. 3, but when fibers of the fibrous web 6 are joined, the fibers can be joined by heat sealing in the direction different from the fibrous direction of the fibrous web 6. The method for joining the fibers may be freely selected from conventionally known methods. Conventionally known positions can be appropriately used for the positions where the fibers of the fibrous web 6 are joined.

In the base material sheet 2, the cut portion 8 is formed from each joining portion 7 in the X direction. The cut portion 8 is formed toward the joining portion group next to the joining portion group including the joining portion 7 from which the cut portion 8 is formed. For example, as illustrated in FIG. 3, the cut portion 8 formed from the joining portion 7 included in the first joining portion group 7a extends in the X direction toward the side at which the joining portions 7 included in the second joining portion group 7b are formed (toward the right side in FIG. 3). In this case, the cut portion 8 extending from the joining portion 7 included in the first joining portion group 7a is formed so that the cut is formed between the corresponding two joining portions 7 included in the second joining portion group 7b. Conversely, the cut portion 8 formed from the joining portion 7 included in the second joining portion group 7b extends in the X direction toward the side at which the joining portions 7 included in the first joining portion group 7a are formed (toward the left side in FIG. 3). As with the cut portion 8 described above, this cut portion 8 is also formed so that the cut is formed between the corresponding two joining portions 7 included in the first joining portion group 7a. The same applies to the cut portions 8 formed from the joining portions 7 included in the third joining portion group 7c and the fourth joining portion group 7d.

The first brush portion 3 can be formed by cutting the fibers of the fibrous web 6 by providing a cut having a width approximately equal to or greater than the width of the joining portion 7 in the aforementioned location after the fibrous web 6 and the base material sheet 2 are joined.

When the fibers constituting the first brush portion 3 are not heat sealable with the base material sheet 2, the joining portion 7 may be formed using an adhesive agent instead of heat sealing. However, even when the fibers constituting the first brush portion 3 are heat sealable with the base material sheet 2, the joining portion 7 may be formed using an adhesive agent. In this case, for example, the fibers in the fibrous web 6 may be non-continuously joined by heat sealing, and the fibrous web 6 and the base material sheet 2 may be joined by adhesive joining. When the fibers are heat sealable with the base material sheet 2, the fibers of the fibrous web 6 may be joined non-continuously by adhesive joining, and the fibrous web 6 and the base material sheet 2 may be joined by heat sealing. However, the fibers of the fibrous web 6 are preferably joined by heat sealing, and the fibrous web 6 and the base material sheet 2 are preferably joined by adhesive joining.

The formation method of the joining portion 7 is not limited to the method combining heat sealing and adhesive joining. Even when the same method is used, the joining of the fibers in the fibrous web 6 and the joining between the fibrous web 6 and the base material sheet 2 may be performed separately. However, in this case, the positions where the fibers of the fibrous web 6 are non-continuously joined and the positions where the fibrous web 6 and the base material sheet 2 are non-continuously joined need to coincide. The joining portions 7 included in each of groups: the first joining portion group 7a, the second joining portion group 7b, the third joining portion group 7c, and the fourth joining portion group 7d may be arranged at regular intervals or at irregular intervals. In addition, the interval between the adjacent joining portions 7 included in the first joining portion group 7a and the interval between the joining portions 7 included in the second joining portion group 7b may be identical or different.

Second Brush Portion 4

With reference back to FIG. 1 and FIG. 2, in the present embodiment, the second brush portion 4 is located in a center part of the base material sheet 2 so as to be interposed between (e.g., bisects) two first brush portions 3. Used for the second brush portion 4 is an air-laid sheet made of an air-laid non-woven fabric formed by crushing pulp and layering crushed pulp. The air-laid sheet is formed by forming crushed pulp into a sheet by adding a binder to crushed pulp, and the binder may be a water-soluble binder such as carboxymethylcellulose (CMC) or ethylene-vinyl acetate copolymer (EVA). Instead of the water-soluble binder, a solid binder such as a thermally adhesive (thermally fusible) plastic material (e.g., acrylic) or conjugated fiber (e.g., ES fiber) may be used, or a solid binder and a water-soluble binder may be used in combination.

The basis weight of the air-laid sheet is preferably approximately 50 g/m² to 200 g/m², more preferably approximately 75 g/m² to 150 g/m². This is because the air-laid sheet having a basis weight less than the aforementioned lower limit exhibits low rigidity and low water absorption, and the scraping performance and the water absorption performance of the cleaning sheet 1 become therefore insufficient. On the other hand, when the basis weight is greater than the aforementioned upper limit, the production cost of the cleaning sheet 1 increases, and the dimension (the thickness) becomes excessively large.

The additive amount of the water-soluble binder is preferably 2.0 weight % to 15 weight % with respect to the air-laid sheet, and the additive amount of the solid binder is preferably 3 weight % to 15 weight % of the basis weight of the air-laid sheet. To increase the rigidity of the air-laid sheet, the additive amount of the binder to the air-laid sheet may be increased.

As described above, when the air-laid sheet is used for the second brush portion 4, the air-laid sheet preferably includes naturally derived fiber materials and is non-hydrolyzable. The air-laid sheet is formed using the air-laid manufacturing method. The "air-laid manufacturing method" is the method for manufacturing the air-laid sheet by subjecting a fibrous accumulated body, which is obtained by accumulating crushed pulp or many fibers mainly made from crushed pulp along the air flow flowing downward, to various processing such as embossing.

When the air-laid sheet is used for the second brush portion 4, a naturally derived fiber material is preferably used as the material. Specifically, a base sheet is preferably formed from pulp paper or a material mainly made from pulp, i.e., the material containing a cellulosic component. Moreover, the proportion of pulp is preferably 30% or greater, more preferably 50% or greater. Furthermore, the proportion of pulp is further preferably 80% or greater. Such a proportion of pulp improves the overall flexibility of the air-laid sheet and further improves the production cost and the production efficiency.

Crushed pulp refers to cotton-like pulp obtained by finely crushing raw material pulp, which is to be a raw material for paper materials, using a crusher or the like. The material for crushed pulp may be various types of raw material pulp. Here, the crushed pulp is cotton-like pulp obtained by crushing a pulp material. Therefore, when cotton-like crushed pulp is sequentially accumulated, spaces are easily formed between fibers. Many spaces are formed among the fibers. Because the spaces are formed, the volume of the base sheet can be increased, and the permeability for a binder and a cross-linker described later is improved. In addition, by forming the base sheet from the cotton-like crushed pulp using the air-laid manufacturing method, the spaces are formed among accumulated fibers, and the degree of freedom of movement of fibers is thereby increased. As a result, the flexibility of the base sheet is improved, and the production efficiency is also improved.

When pulp is used as the material for the air-laid sheet to be used for the second brush portion 4, various types of raw material pulp may be used as the pulp. Examples of the raw material pulp include wood pulp, synthetic pulp, waste paper pulp, and a toilet paper material. As the wood pulp, pulp obtained by blending bleached softwood kraft pulp and bleached hardwood kraft pulp at predetermined ratios may be used. The bleached softwood kraft pulp can be obtained from softwood such as red pine, Ezo spruce, Todo fir, Douglas fir, hemlock, and spruce, and the bleached hardwood kraft pulp can be obtained from hardwood such as beech, Japanese oak, birch, eucalyptus, oak, and alder. However, use of raw material pulp made of bleached softwood kraft pulp is preferable in terms of manufacturing. When natural fiber is used as the material used for the base sheet, for example, kenaf fiber, bamboo fiber, straw, cotton, cocoon filament, or sugar cane is preferably used. The above materials are merely examples, and the materials are not limited to these examples. Crushed pulp or a material including crushed pulp as a main raw material is preferably used for the fibrous sheet in accordance with the present embodiment.

Binder

The binder is for binding the naturally derived fiber materials constituting the base sheet. Any binder that is naturally degradable, has a predetermined adhesivity, and joins the above materials with a predetermined strength can be used. Examples of such a binder include polysaccharide derivative, natural polysaccharide, synthetic polymer, protein, alginic acid, and chitosan. Examples of the polysaccharide derivative include carboxymethylcellulose (CMC), carboxyethyl cellulose, carboxymethylated starch, salts of carboxymethylated starch, starch, methylcellulose, and ethyl cellulose. Examples of the natural polysaccharide include guar gum, trantgum, xanthan gum, alginic acid sodium, carrageenan, gum arabic, gelatin, and casein. Furthermore, examples of the synthetic polymer include polyvinyl alcohol (PVA), ethylene-vinyl acetate copolymer resin (EVA), polyvinyl alcohol derivative, polymer or copolymer of unsaturated carboxylic acid, and its salts. Examples of the unsaturated carboxylic acid include acrylic acid, methacrylic acid, maleic anhydride, maleic acid, and fumaric acid. Among them, in particular, carboxymethylcellulose (CMC) and polyvinyl alcohol (PVA) are preferable. These binders may be used alone or in combination by mixing two or more kinds of binders. The binder used as the fibrous sheet of the present embodiment is preferably a naturally degradable binder including: biodegradable resin such as polycaprolactone, polyhydroxyalkanoate, polyhydroxybutyrate, polylactic acid, starch-based resin such as esterified starch, cellulose acetate, polyethylene succinate, polyvinyl alcohol, polyglycolic acid, chitosan/cellulose/starch, poly(hydroxybutyrate/hydroxyhexanoate), poly(caprolactone/butylene succinate), polybutylene succinate, poly(butylene succinate/adipate), poly(butylene succinate/carbonate), poly(ethylene terephthalate/succinate), poly(butylene adipate/terephthalate), and poly(tetramethylene adipate/terephthalate); biodegradable resin mixture; or biodegradable biomass resin.

There are various types of CMC such as ammonium salt, sodium salt, and potassium salt. Among these CMCs, ammonium CMC has a so-called self-cross-linking property, which forms cross-link when heat is applied thereto. Thus, when ammonium CMC is used as the binder, the impregnation amount of the cross-linker may be less than that in the case where other kinds of CMC are used as the binder, or impregnation with a cross-linker is unnecessary. Among PVAs, there are PVA that needs a cross-linker and PVA that does not need a cross-linker. Thus, when the PVC that does not need a cross-linker is used, impregnation with a cross-linker is unnecessary.

Cross-Linker

The cross-linker is chemicals that yield a cross-linking reaction with the binder to cause the binder to have a cross-linked structure. The cross-linker of the present embodiment is preferably naturally degradable. For example, when the binder having a carboxyl group such as carboxymethylcellulose (CMC) is used, polyvalent metal ion of which the valence is two or more is preferably used. Examples of this polyvalent metal ion include metal ions of magnesium, calcium, titanium, manganese, iron, cobalt, nickel, copper, zinc, aluminum, silver, tin, and the like. The following compounds: aluminum hydroxide, aluminum chloride, aluminum sulfate, dihydroxyaluminum aminoacetate, kaolin, aluminum stearate, aluminum hydroxide magnesium, aluminum hydroxide potassium, aluminum sulfate potassium (also known as alum), magnesium aluminometasilicate, aluminum glycinate, magnesium aluminometasilicate, aluminum nitrate, aluminum sulfate, aluminum acetate, aluminum hydroxide ferrous sulfate, ferrous chloride, zinc sulfate, cupric chloride, tin chloride, and silver nitrate may be used alone or in any combination of two or more of them as chemical compounds supplying polyvalent metal ions. In the fibrous sheet of the present embodiment, in particular, alum and copper sulfate are preferably used. Examples of the alum include sodium aluminum alum, potassium alum, ammonium alum, sodium chrome alum, potassium chrome alum, ammonium chrome, sodium iron alum, potassium iron alum, and ammonium iron alum. Colorless alum is preferable as the alum of the present embodiment. Thus, use of sodium aluminum alum, potassium alum, or ammonium alum is preferable. For example, when ammonium alum is used as the alum, the concentration of the ammonium alum solution is preferably approximately 1% to 20%, and the temperature of the ammonium alum solution is preferably maintained at 10° C. to 60° C. to prevent crystallization.

The air-laid sheet used for the second brush portion 4 is heat treated while being impregnated with the binder and the cross-linker. This heat treatment accelerates the cross-linking reaction of the binder that binds the materials constituting the air-laid sheet and the cross-linking reaction of the cross-linker for cross-linking the binders, increasing the binding between fibers, and improving the binding strength significantly. For this heating, use of air blow heating performed by circulating hot air within a chamber having predetermined dimensions is preferable. The heat-treated air-laid sheet is preferably impregnated with a softening agent.

The air-laid sheet after heat treated or the air-laid sheet impregnated with a softening agent is preferably cleaned to obtain a softer air-laid sheet for the second brush portion 4. When cleaned, the air-laid sheet to be used for the second brush portion 4 is preferably washed with use of liquid such as water. Through the above processes, the air-laid sheet that is soft and strong is obtained. Because the second brush portion 4 made of the air-laid sheet formed in the above manner is soft, the second brush portion 4 can capture the removal target object that cannot be captured by the first brush portions 3 because the removal target object is large or rigid, by wrapping around the removal target object with the air-laid sheet. Thus, the removal target object that cannot be captured by the first brush portion 3 can be reliably captured, and it becomes possible to efficiently clean the cleaning target surface such as the floor surface. Because the second brush portion 4 has the surface 4a and the side surfaces 4b, the floor surface F can be wiped using the surface 4a, and further, the removal target objects can be captured using the side surfaces 4b. Therefore, efficient cleaning becomes possible.

In addition, in the second brush portion 4, a space Z for capturing the removal target object as a foreign object is formed between crushed pulp and crushed pulp. This structure allows the captured removal target object to be taken inside the space Z. Therefore, even when the removal target object that is likely to damage the floor surface F is captured, the cleaning can be continued without damaging the floor surface F, and worry-free cleaning becomes possible.

In the second brush portion 4, patterns 9 are formed. The patterns 9 are formed using a pair of embossing rolls 18, and extend along the Y direction intersecting with the wiping direction (the X direction) in the present embodiment, but this does not intend to suggest any limitation. The patterns 9 may extend along the X direction, or the patterns 9 may extend in the X direction and the Y direction, or patterns may be inclined at, for example, 45° from the X direction. The shape of the pattern 9 is not limited to a linear shape, and may be a wavy curved shape.

In the present embodiment, to improve the ability for capturing the foreign object, the pattern 9 is a linear pattern having a width of approximately 1 mm to 6 mm in the X direction, a length of approximately 5 mm to 50 mm in the Y direction, and a depth of approximately 0.3 mm to 3 mm. However, the dimensions are not limited to the above dimensions. Formation of the patterns 9 on the surface 4a of the second brush portion 4 enables to easily capture removal target objects, and also allows the space Z in the second brush portion 4 to easily hold the captured removal target object. Thus, the removal target object such as dust can be more easily captured, and the cleaning performance is further improved.

As clear from the above description, the rigidity of the second brush portion 4 is greater than the rigidity of the first brush portion 3. Thus, the second brush portion 4 is excellent at scraping foreign objects. Because the second brush portion 4 is the air-laid sheet formed by layering crushed pulp, the spaces formed among crushed pulp can capture foreign objects such as bread crumbs and cookie crumbs smaller than cotton dust. Furthermore, even the patterns 9 can capture small foreign objects.

Side Edge Portions 5

The side edge portions 5 are portions to be attached to the cleaning tool 101, and are located in both ends in the X direction that is the wiping direction. When the dimension of the base material sheet 2 in the X direction is 220 mm, the width in the X direction of each side edge portion 5 is approximately 45 mm Thus, the total width in the X direction of the two first brush portions 3 and the second brush portion 4 is approximately 130 mm. In addition, the dimension in the X direction of one first brush portion 3 is approximately 40 mm to 50 mm, and the dimension in the X direction of the second brush portion 4 is approximately 30 mm to 50 mm.

When the area of the first brush portion 3 and the area of the second brush portion 4 are compared with the area of the base material sheet 2, the total area of two first brush portions 3 is 35% to 45% of the area of the base material sheet 2, the area of the second brush portion 4 is 13% to 23% of the area of the base material sheet 2, and the total area of the two side edge portions 5 is 35% to 45% of the area of the base material sheet 2. By configuring the ratios of the areas of the first brush portions 3, the second brush portion 4, and the side edge portions 5 to be the above ratios, the well-balanced cleaning sheet 1 is achieved. The area of one first brush portion 3 and the area of the second brush portion 4 may be equal, and the total area of the two first brush portions 3 and the total area of the two side edge portions 5 may be equal.

In the cleaning sheet 1 of the present embodiment, the first brush portions 3 capture hairs, cotton dust, and oil, while the second brush portion 4 scrapes foreign objects adhering to, for example, the floor surface, captures small foreign objects of foods such as bread crumbs and cookie crumbs, and absorbs liquid. Thus, the cleaning sheet 1 capturing and absorbing many foreign objects is achieved. In addition, when the cleaning sheet 1 is a wet-type cleaning sheet, the air-laid sheet of the second brush portion 4 absorbs a large amount of a chemical liquid, and therefore the floor area that the cleaning sheet 1 can clean can be increased.

Figure 5:
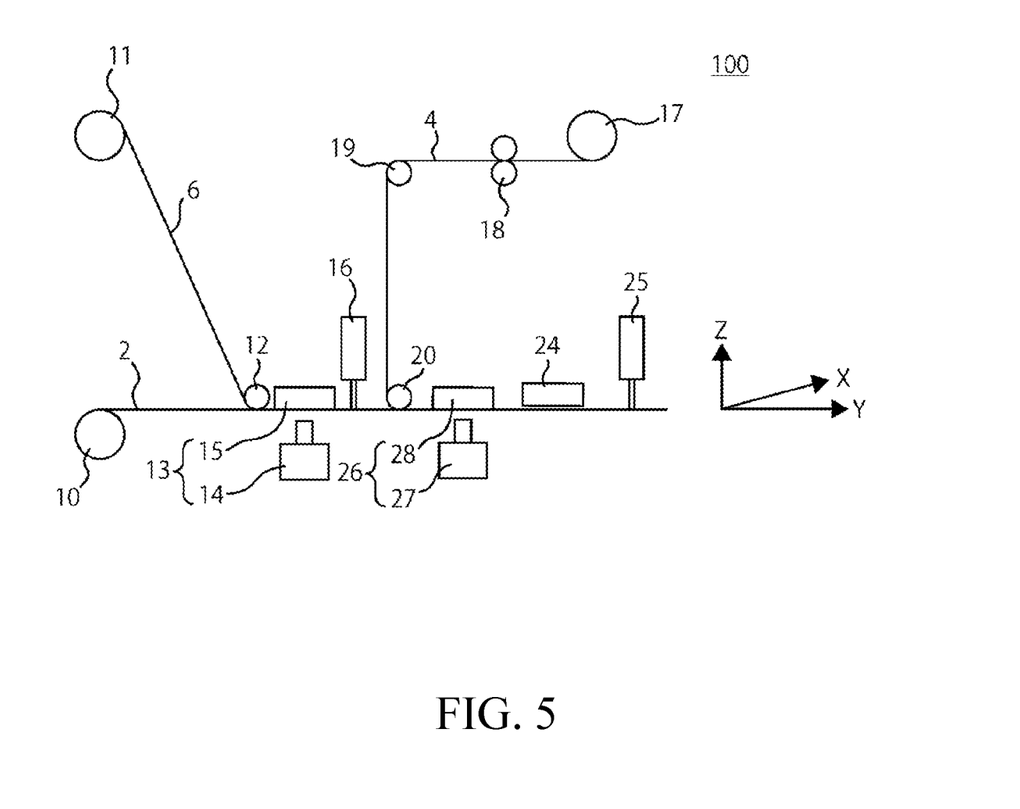
FIG. 5 illustrates an outline of a production line for the cleaning sheet of the present embodiment.

FIG. 5 illustrates an outline of a production line 100 of the cleaning sheet 1. The following describes a manufacturing method of the cleaning sheet 1 of the present embodiment formed as described above. The layout of the production line 100 illustrated in FIG. 5 is merely an example, and the arrangement of devices can be appropriately modified to the space of the factory.

Joining Between the Base Material Sheet 2 and the Fibrous Web 6

The base material sheet 2 wound around a first roll 10 is conveyed in the Y direction that is the machine direction (the conveying direction). The fibrous web 6 wound around a second roll 11 is conveyed toward the base material sheet 2. Although only one second roll 11 is illustrated in FIG. 5, another second roll 11 is present in a direction orthogonal to the page, and two fibrous webs 6 in total are conveyed.

The base material sheet 2 and the fibrous webs 6 are pressed by a pressure roll 12, and are then joined using an ultrasonic joining device 13. The ultrasonic joining device 13 includes a horn 14 and an anvil 15. The horn 14 resonates with ultrasonic vibration to vibrate, and applies the vibration energy to the base material sheet 2 and the fibrous webs 6 to cause frictional heat to be generated. The anvil 15 determines the positions of the base material sheet 2 and the fibrous webs 6, and receives the vibration energy.

Forming of the Cut Portion 8

A plurality of the cut portions 8 is formed in the base material sheet 2 and the fibrous webs 6, which have been joined by the ultrasonic joining device 13, by a cutter 16. The cutter 16 has a plurality of blades that can be replaced in accordance with the position and the length of the cut portion 8 illustrated in FIG. 3 and FIG. 4. FIG. 3 and FIG. 4 illustrate the cleaning sheet in the middle of production, in which the forming of the cut portions 8 is completed.

Forming of the Patterns 9 in the Second Brush Portion 4

The second brush portion 4 wound around a third roll 17 is conveyed by a conveying roll 19 toward the base material sheet 2 and the fibrous webs 6 that are joined. The patterns 9 are formed in the second brush portion 4 by a pair of the embossing rolls 18 during the conveying. As described above, the shape and the dimensions of the pattern 9 can be set appropriately. At least one of a pair of the embossing rolls 18 is preferably heated within a range from 40° C. to 120° C., and the material of the embossing rolls 18 may be a metal material or non-metal material.

Joining Between the Base Material Sheet 2 and the Second Brush Portion 4

The second brush portion 4 having the patterns 9 formed therein and the base material sheet 2 and the fibrous webs 6 that are joined are pressed by a pressure roll 20, and the second brush portion 4 is then joined to the base material sheet 2 using an ultrasonic joining device 26. The ultrasonic joining device 26 includes a horn 27 and an anvil 28, and the structure and the functions thereof are the same as those of the ultrasonic joining device 13. Thus the description thereof is omitted. Two first brush portions 3 and one second brush portion 4 are joined to the base material sheet 2. When the basis weight of the air-laid sheet of the second brush portion 4 is 70 g/m$^2$ or greater, the height in the Z direction is higher than that of the first brush portion 3 before raised. This allows the second brush portion 4 to easily come in contact with a wood floor, a tatami floor, and other floor surfaces when the cleaning sheet 1 is used for cleaning. Thus, small foreign objects can be easily captured by the second brush portion 4 provided in the center part of the cleaning sheet 1, and the foreign objects adhering to the floor surface can be easily scraped off.

Process for Raising the First Brush Portion 3

The fibrous web 6 of the first brush portion 3 is raised using a raising device 24. The raising device 24 supplies compressed gas (e.g., air) toward the fibrous web 6. This raises the fibers of the fibrous web 6. If the fibrous web 6 is raised before the second brush portion 4 is joined to the base material sheet 2, the second brush portion 4 needs to be joined to the base material sheet 2 while avoiding the fibrous web 6. By contrast, in the present embodiment, the fibrous web 6 is raised after the second brush portion 4 is joined to the base material sheet 2. Therefore, the manufacturing of the cleaning sheet 1 can be simplified, the yield ratio of the cleaning sheet 1 is improved, and the production cost of the cleaning sheet 1 can be reduced. The method used to raise the fibrous web 6 is not limited to the method using compressed gas, and various types of raising methods can be applied.

Cut

Figure 1:
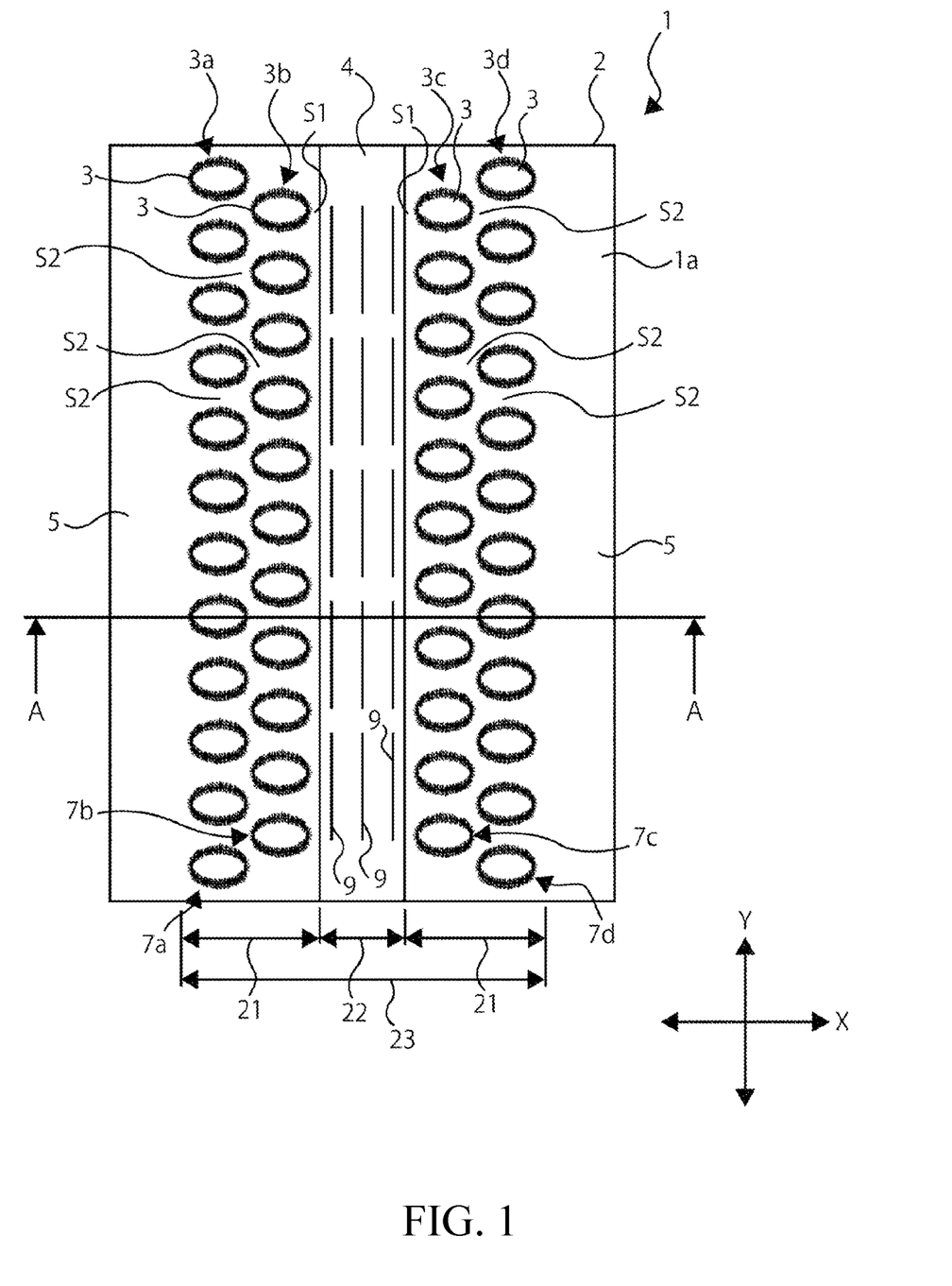
FIG. 1 illustrates a cleaning sheet of a present embodiment.
Figure 2:
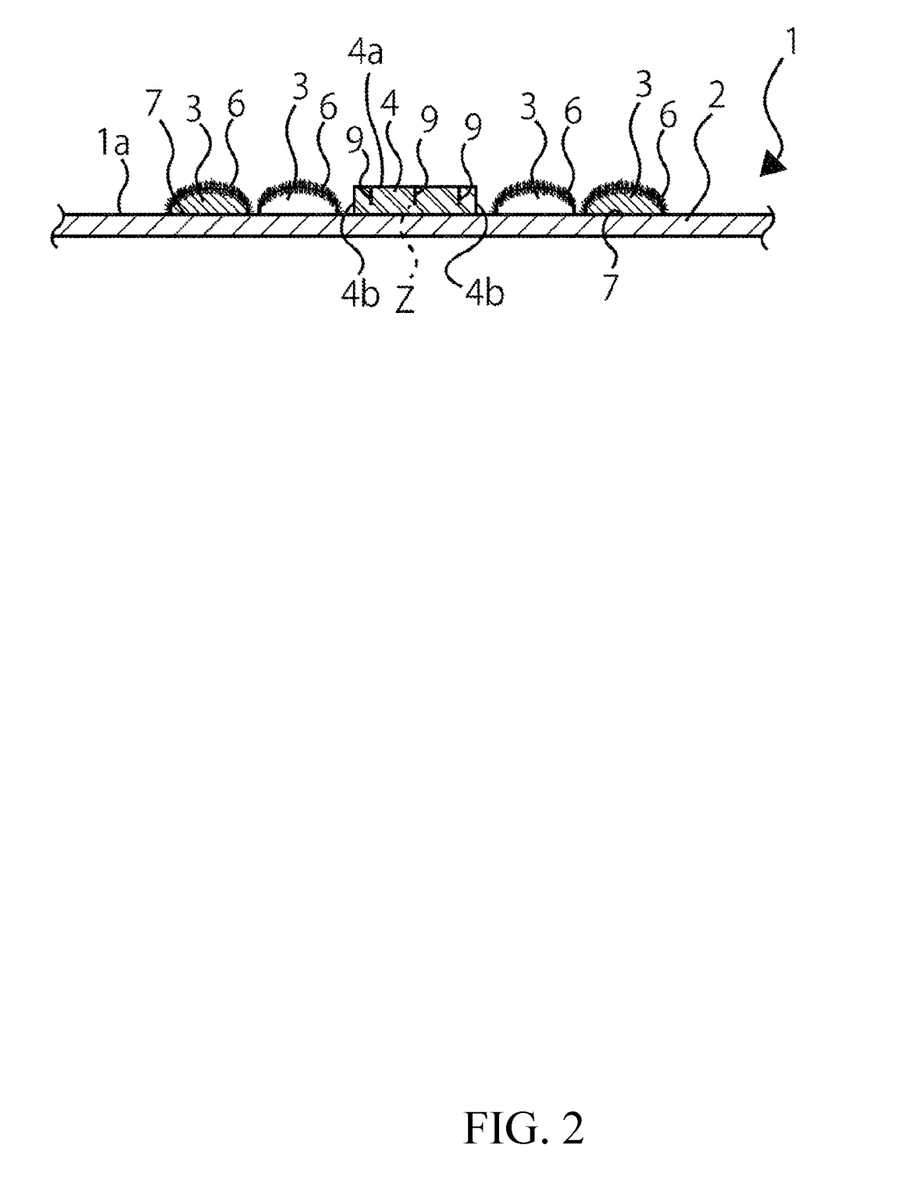
FIG. 2 is a cross-sectional view of the cleaning sheet of the present embodiment taken along line A-A in FIG. 1.

Subsequent to the raising process, the base material sheet 2 to which the first brush portions 3 and the second brush portion 4 are joined is cut along the X direction by a cutting device 25, and the cleaning sheet 1 illustrated in FIG. 1 is obtained.

The cleaning sheet 1 is not limited to the aforementioned embodiment, and can be modified in various ways. For example, a plurality of the second brush portions 4 may be provided to the base material sheet 2, and the first brush portion 3 and the second brush portion 4 may be formed on both surfaces of the base material sheet 2.

The stretchable sheet having a three-layered fibrous sheet and an elastic member disclosed in International Publication No. WO2018/003566 may be joined to the base material sheet 2 as a third brush portion, or at least one of the two first brush portions 3 may be replaced with this stretchable sheet.

Furthermore, an elastic member may be provided to the air-laid sheet of the second brush portion 4 to allow stretchability in the second brush portion 4. In this case, the patterns 9 may be provided, or the patterns 9 may be omitted.

Although some embodiments of the cleaning sheet in accordance with the present invention have been described in detail, the above embodiments are merely examples of the cleaning sheet in accordance with the present embodiment, and the present invention is not limited to these embodiments. Thus, the present invention may be varied or changed within the scope of the present invention as claimed.

A list of reference letters or numerals used in the drawings and specification is shown below.
1 Cleaning sheet
1a Cleaning surface
2 Base material sheet
3 First brush portion
4 Second brush portion
5 Side edge portion
6 Fibrous web
7 Joining portion
7a First joining portion group
7b Second joining portion group
7c Third joining portion group
7d Fourth joining portion group
8 Cut portion
9 Pattern
18 Pair of embossing rolls
101 Cleaning tool
102 Head portion
103 Handle
104 Mounting component
F Floor surface

The invention claimed is:

1. A cleaning sheet for cleaning a cleaning target object, comprising:
a base material sheet having a first surface;
a fibrous web formed of a fiber material that includes a first part that is bonded to the first surface of the base material sheet and a second part that includes first brush portions, wherein the first brush portions include:
a first group of spaced apart first brush portions formed in a row in a Y direction measured along a length of the cleaning sheet, and
a second group of spaced apart first brush portions formed in a row in the Y directon and that is spaced apart from the first group of the first brush portions; and
a second brush portion that is provided to the first surface of the base material sheet and is formed of crushed pulp materials that are layered, wherein the second brush portion is located between, and spaced apart from, an entirety of the first group of the first brush portions and an entirety of the second group of the first brush portions with respect to an X direction that is measured transverse to the Y direction along a width of the cleaning sheet,
wherein a height of the second brush portion as measured from the first surface is greater than a height of the first part of the fibrous web as measured from the first surface, and
wherein a rigidity of a fiber constituting the second brush portion is greater than a rigidity of a fiber constituting the first brush portions.

2. The cleaning sheet according to claim 1, wherein:
the base material sheet has a cleaning region for cleaning the cleaning target object,
the first brush portions and the second brush portion are formed in the cleaning region, and
the first surface of the base material sheet, a surface of the first brush portions, and a surface of the second brush portion form a cleaning surface for cleaning the cleaning target object.

3. The cleaning sheet according to claim 1, wherein the second brush portion is located in a center part of the base material sheet so as to be interposed between the first group of the first brush portions and the second group of the first brush portions.

4. The cleaning sheet according to claim 1, wherein a first guide path that guides a removal target object to the first brush portions or the second brush portion is formed between the first brush portions and the second brush portion.

5. The cleaning sheet according to claim 1, wherein the first brush portions in the first group are sequentially shifted from the first brush portions in the second group in the Y direction.

6. The cleaning sheet according to claim 5, wherein the second brush portion extends in the Y direction parallel to the first group of the first brush portions and the second group of the first brush portions.

7. The cleaning sheet according to claim 5, wherein a second guide path that guides a removal target object to the first brush portions or the second brush portion is formed between the first brush portions adjacent to each other.

8. The cleaning sheet according to claim 1, wherein the second brush portion is formed of an air-laid non-woven fabric.

9. The cleaning sheet according to claim 8, wherein the second brush portion is formed of the air-laid non-woven fabric layered in plural.

10. The cleaning sheet according to claim 1, wherein a total area of the first brush portions is greater than an area of the second brush portion.

11. The cleaning sheet according to claim 1, wherein:
the second brush portion has a cleaning surface, and
a pattern is formed on the cleaning surface.

12. The cleaning sheet according to claim 11, wherein the pattern extends along a direction different from the X direction measured along the width of the cleaning sheet.

13. The cleaning sheet according to claim 1, wherein the second brush portion has a space for capturing a foreign object, the space being formed between the crushed pulp materials.

14. The cleaning sheet according to claim 6, wherein a second guide path that guides a removal target object to the first brush portions or the second brush portion is formed between the first brush portions adjacent to each other.

15. The cleaning sheet according to claim 2, wherein a total area of the first brush portions is greater than an area of the second brush portion.

16. The cleaning sheet according to claim 2, wherein:
the second brush portion has a cleaning surface, and
a pattern is formed on the cleaning surface.

17. The cleaning sheet according to claim 16, wherein the pattern extends along a direction different from the X direction measured along the width of the cleaning sheet.

18. The cleaning sheet according to claim 2, wherein the second brush portion has a space for capturing a foreign object, the space being formed between the crushed pulp materials.

19. The cleaning sheet according to claim 16, wherein the second brush portion is located in a center part of the base material sheet so that the second brush portion bisects the first group and the second group.

20. The cleaning sheet according to claim 1, wherein the first brush portions are made of a material different than that of the second brush portion.

* * * * *